Nov. 16, 1954    J. CALLING ET AL    2,694,607
CONNECTING ROD AND PISTON ASSEMBLY
Filed July 13, 1949    4 Sheets-Sheet 1
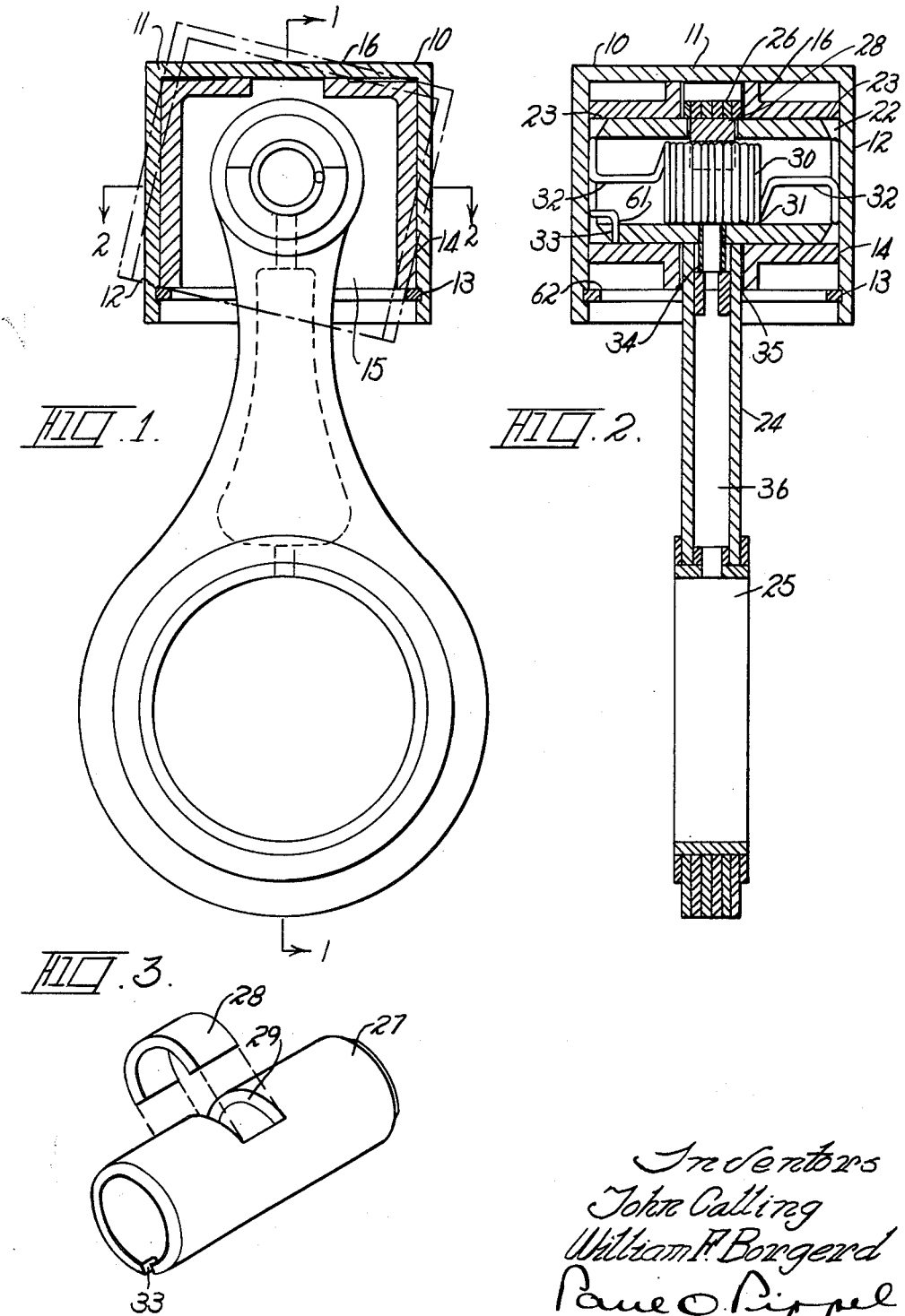

Nov. 16, 1954  J. CALLING ET AL  2,694,607

CONNECTING ROD AND PISTON ASSEMBLY

Filed July 13, 1949  4 Sheets-Sheet 2

Inventors
John Calling
William F. Borgerd
Paul O. Pippel
Atty

Nov. 16, 1954     J. CALLING ET AL     2,694,607
CONNECTING ROD AND PISTON ASSEMBLY
Filed July 13, 1949     4 Sheets-Sheet 3

Inventors
John Calling
William F. Borgerd
Paul O. Pippel
Atty

Nov. 16, 1954                J. CALLING ET AL                2,694,607
                      CONNECTING ROD AND PISTON ASSEMBLY
Filed July 13, 1949                                     4 Sheets-Sheet 4
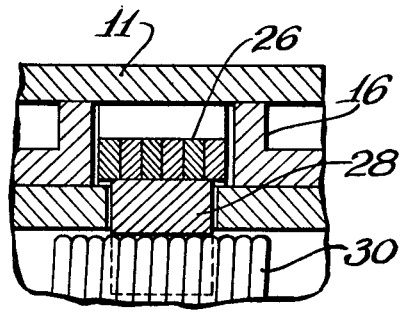
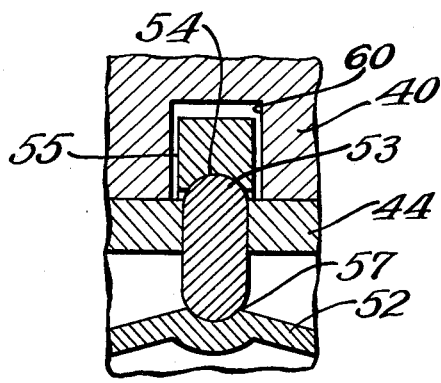
Inventors:
John Calling
William F. Borgerd
Paul O. Pippel Atty.

United States Patent Office 2,694,607
Patented Nov. 16, 1954

2,694,607

CONNECTING ROD AND PISTON ASSEMBLY

John Calling and William F. Borgerd, Evansville, Ind., assignors to International Harvester Company, a corporation of New Jersey Application July 13, 1949, Serial No. 104,526

14 Claims. (Cl. 309—19)

This invention relates to an improved piston and connecting rod assembly for compressors and the like. More particularly it relates to a novel piston construction and the connection between a connecting rod and a piston.

The conventional piston and connecting rod assembly generally comprises a piston having a head portion and a skirt portion which has aligned transverse openings to provide wrist pin bearings. A connecting rod is usually keyed to a wrist pin which in turn is journaled in said transverse openings in the skirt portion. The connecting rod receives power from a rotatable crank shaft and transmits the power to the piston by way of the wrist pin. The piston then compresses the gas within the cylinder to a desired pressure.

Heretofore, it was necessary to employ elaborate means to obtain a high volumetric efficiency because the compressed gas has a tendency to leak between the piston and cylinder thereby reducing the ratio of the actual gas pumped with respect to the volume swept by the piston during its travel in the cylinder. Since the conventional piston has wrist pin bearing openings in the piston skirt, the compressor efficiency, which is directly related to volumetric efficiency, is decreased by the escape of compressed gases from within the cylinder, through the wrist-pin bearing openings, to the crankcase. With this fact in mind, compressor manufacturers have increased the length of the piston skirt; i. e., the sealing surface to overcome this difficulty. Hence, one of the objects of the present invention is to provide a piston skirt which is imperforated and continuous so that for a given size cylinder and percentage compressor efficiency the length of the piston skirt may be decreased and still maintain the desired degree of compressor efficiency.

It is highly desirable in the commercial world to manufacture a machine in which the parts are interchangeable with parts in like machines and to eliminate as much as possible the rejection of parts due to slight inaccuracies in size and yet allow a fairly wide manufacturing tolerance. It is therefore the principal object of this invention to provide a connecting rod and piston assembly which is self-aligning. In other words, the cylinder block and the crank shaft may be slightly out of line and yet with the construction of the present invention the parts will not be rejected due to these slight inaccuracies. The connecting rod and piston assembly will adapt itself to these slight inaccuracies and function as efficiently as if no errors in construction were present.

Another object is to provide a compressor that pumps a volume of gas nearly equal to the swept volume of the pistons.

Still another object is to produce a connecting rod and piston assembly for compressors which is designed to operate smoothly and quietly and retain that smoothness for years of usage.

A further object of the present invention is to provide a novel wrist pin carrier completely enclosed within the piston skirt.

A still further object is the provision of a self-aligning device enclosed within the wrist pin and using a small number of parts.

Other objects and desirable features will become apparent from the reading of the ensuing description of the invention taken in conjunction with the annexed drawings in which:

Fig. 1 is a side elevational view showing the wrist pin carrier and the piston in cross-section.

Fig. 2 is a view similar to Fig. 1 and taken substantially along the line 1—1 of Fig. 1.

Fig. 3 is a perspective view of the hollow wrist pin showing the loose segment removed from its cooperating slot.

Fig. 10 is a greatly enlarged fragmentary view of a portion of the connection between the connecting rod bearing and the wrist pin shown in Fig. 2.

Fig. 11 is a fragmentary view similar to Fig. 10, but showing the connection between the connecting rod bearing and the wrist pin shown in Fig. 7.

Figures 4, 5:
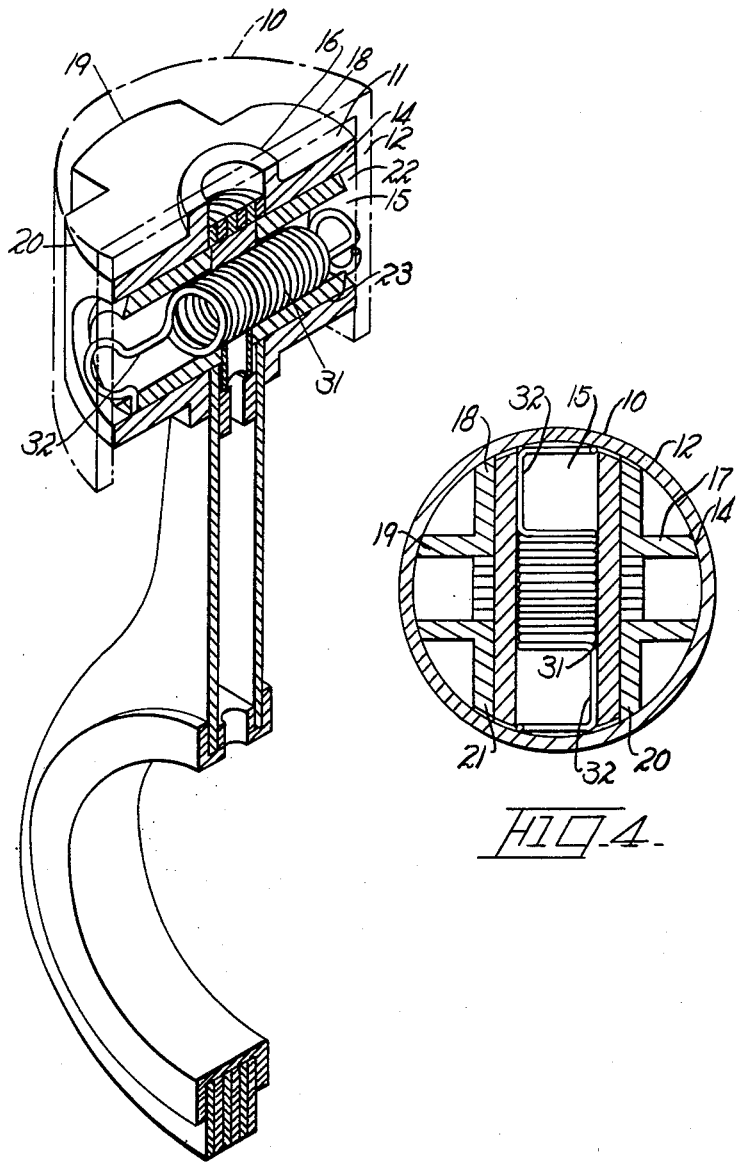
Fig. 4 is a plan sectional view taken substantially along the line 2—2 of Fig. 1.
Fig. 5 is a perspective view in section of the connecting rod and piston assembly.

Referring to the drawings in which like reference characters indicate like parts, the connecting rod and piston assembly includes a piston 10 having a flat head portion 11 and a hollow cylindrical skirt portion 12. Located at the end opposite the head portion, the skirt portion has an internal annular groove 13.

A wrist pin carrier 14 is adapted to be rigidly supported within the hollow cylindrical skirt portion 12. The wrist pin carrier 14 has a hollow central portion 15 and a plurality of circumferentially spaced radially disposed portions or bosses 17, 18, 19 and 20 having their outer surfaces rounded or contoured as shown at 21 to conform substantially to the contour of the interior wall of said piston skirt portion 12. The wrist pin carrier 14 also has a central raised portion 16 which has a diameter less than the interior diameter of the piston skirt portion 12. Two of said radially disposed portions 18 and 20 are diametrically opposed and provided with aligned openings 22 to define bearing surfaces 23.

A connecting rod 24 is provided which is made up of steel punchings in laminated form and brazed together. It is to be understood that any conventional type connecting rod could be used in lieu of that disclosed since the present invention is not concerned with the connecting rod construction. The connecting rod has a crank shaft bearing 25 at one end and a bearing 26 at its opposite end. The wrist pin bearing 26 is adapted to fit within the hollow central portion 15 of the wrist pin carrier 14.

A hollow wrist pin 27 is arranged within said wrist pin bearing 26 and journaled in bearing surfaces 23 on said wrist pin carrying member 14. Means are provided for allowing limited longitudinal and angular relative movement of the wrist pin 27 with respect to the longitudinal axis of the connecting rod 24 which comprise a slidable segment 28 of greater thickness than the wall thickness of the hollow wrist pin 27. As best seen in Fig. 3, the loose segment is adapted to fit in an arcuate slot 29 formed in wrist pin 27 midway between its ends. A helical spring 30 is disposed along the longitudinal axis of wrist pin 27 and is in frictional engagement with the interior wall of the wrist pin 27 as shown generally by reference character 31. The helical spring 30 has a pair of oppositely projecting leg portions 32 adapted to abut the interior wall of the piston skirt portion 12. Hence, it will be apparent that spring 30 is centered within wrist pin 27. One of the legs 32 has a transversely projecting portion 61 adapted to fit in a notch 33 formed in one end of the wrist pin 27 to prevent spring 30 from slowly working around in a rotary direction under the combined action of all of the forces acting on it. It is to be understood that spring 30 continually urges said slidable segment 28 laterally from said wrist pin 27 into engagement with the wrist pin bearing 26 (Fig. 10). Means are provided to prevent relative rotational movement between the connecting rod 24 and the wrist pin 27 which comprise a hollow key member 34 rigidly held within an aperture formed in the wrist pin 27 and projecting laterally into a slightly elongated slot 35 formed in the wrist pin bearing 26. It will be apparent that with this keying arrangement wrist pin 27 may move along the longitudinal axis of the connecting rod and also may rock angularly about the longitudinal axis since slot 35 allows key member 34 to move slightly endwise and longitudinally with respect to the longitudinal axis of wrist pin bearing 26. The key 34 is provided with a longitudinal opening which communicates with the interior of the wrist pin 27 on one end and a hollow passageway 36 in the connecting rod 24. These openings are provided for the passage of lubricating oil from the crank bearing 25 to the wrist pin bearing 26 and the wrist pin carrier 14. It will be noted that a slight side clearance between the lowermost central portion of wrist pin carrier 14 and upper portion of connecting rod 24 is provided to allow for slight out of squareness of the cylinder with the crankshaft.

The flexibility of the wrist pin connection with the wrist pin bearing 26 will permit slight inaccuracies in alignment caused by variances in the size of the parts without causing excess friction. The slidable segment is continually forced against the connecting rod bearing and hence insures a running fit at all times regardless of the period of use. Any looseness between the parts which may develop due to excessive wear will be automatically compensated for by the novel connection described above.

In assembly the wrist pin carrier 14 is placed over the end of the wrist pin bearing 26. Wrist pin 37 with loose or slidable segment 28 in slot 29 is inserted in one of the side openings 22 of wrist pin carrier 14. Hollow key 34 is then inserted. Spring 30 is then forced into wrist pin 27 in such a manner that leg portions 32 slightly protrude from both ends of the wrist pin. Wrist pin carrier 14 together with wrist pin 27 and connecting rod 24 is then advanced within piston skirt 12 applying a small amount of force in assembly until raised portion 16 is in contact with the under side of the piston head portion 11. The piston head portion 11 being a flat plate is slightly deformable. When force is applied to the wrist pin carrier 14 the piston head 11 tends to bulge outwardly a very small amount since the upward assembly force is concentrated about the central portion of the head 11. A resilient snap ring 62 is then slipped in groove 13 and provides a seat for the lowermost surface of the wrist pin carrier. By this method of assembly the bulged piston head 11 acts as a resilient force tending to continually force the wrist pin carrier 14 upon its seat. Thus, it will be apparent that a very rigid construction is produced which will not become loose and noisy after long periods of use.

Referring to Figs. 6, 7, 8, 9 and 11, a modified form of piston and connecting rod assembly is shown wherein reference character 37 designates a flat head portion of a piston closing one end of an imperforated cylinder skirt portion 38. An internal annular groove 39 is located on the skirt portion 38 at the end opposite the head portion 37.

Figure 6:
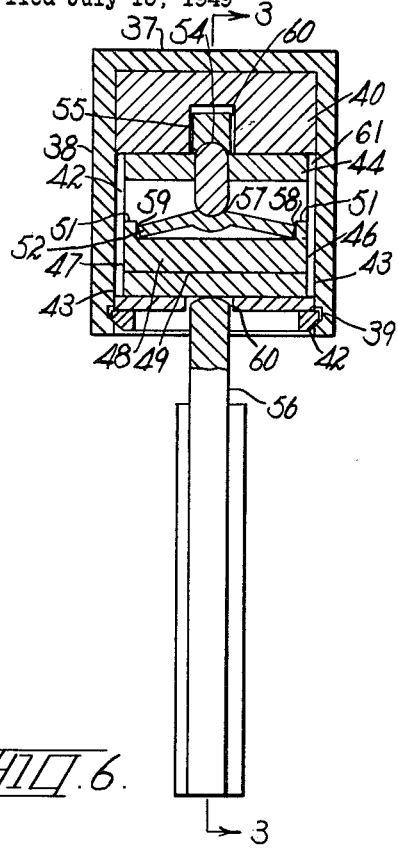
Fig. 6 is a side elevational view showing a modified form of the invention.
Figure 7:
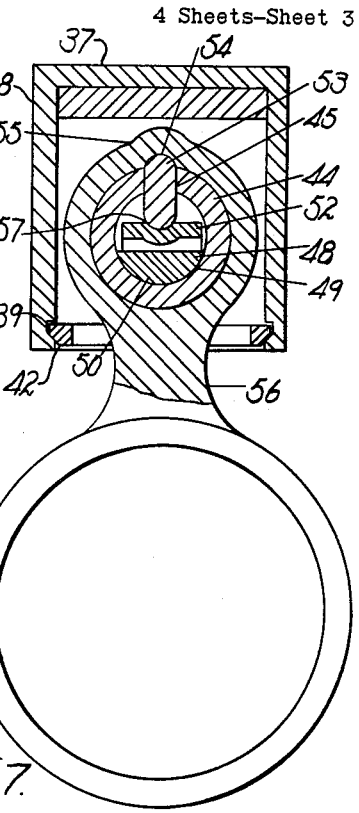
Fig. 7 is a view similar to Fig. 6 and taken substantially along the line 3—3 of Fig. 6.
Figure 8:
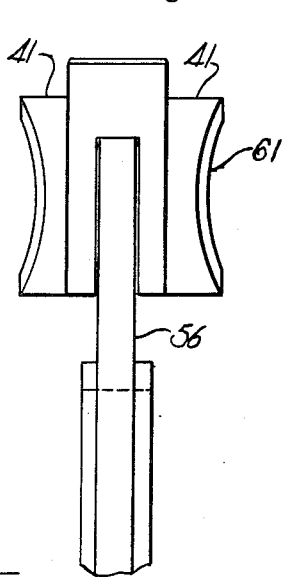
Fig. 8 is a view similar to Fig. 6 with the piston removed to show the wrist-pin carrying member.
Figure 9:
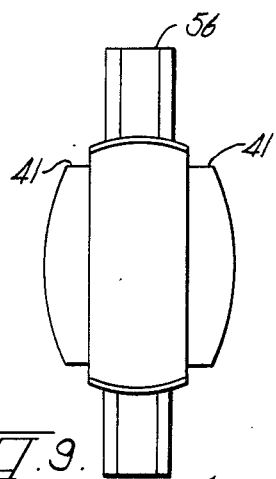
Fig. 9 is a plan view of the modified form with the piston removed.

A cross-shaped wrist pin carrier 40 having a pair of diametrically opposed bossess 41, is rigidly held within the skirt portion 38 by means of a tappered resilient snap ring 42 expanded in groove 39. As best seen in Figs. 6 and 7, the ring tends to urge the wrist pin carrier 40 against the interior surface of the head portion 37. Bosses 41 of the wrist pin carrier 40 are contoured to conform to the interior surface of the piston skirt portion 38 and are bored to provide transverse aligned openings 61 to define bearing surfaces 43. Rotatively held within bearing surfaces 43 is a hollow wrist pin 44 of relatively large diameter. The diameter of wrist pin 44 is made large to provide a large bearing surface between the wrist pin carrier 40 and the wrist pin 44 to decrease the possibility of wrist pin breakage or bearing looseness and noise.

Wrist pin 44 has a laterally extending aperture 45 formed on its periphery between its longitudinally spaced ends 46 and 47. Positioned within the wrist pin 44 and having a portion 48 substantially semi-circular in cross-section abutting the interior wall 49 of wrist pin 44 is a spring supporting member 50. Member 50 has a pair of longitudintally spaced portions 51 projecting laterally from the semi-circular portion 48. A leaf spring 52 is disposed along the longitudinal axis of the wrist pin 44.

A pin 53 is slidably mounted in aperture 45 and is adapted to project laterally into a recess 54 formed in a wrist pin bearing 55 of a connecting rod 56 to key the wrist pin to the connecting rod and prevent relative rotational movement between these parts. Spring 52 has a central portion 57 slightly depressed to provide a seat for one end of the pin 53. The ends 58 and 59 of spring 52 almost abut portions 51 of the spring supporting member 50 for locating or positioning purposes. In addition, spring 52 is initially formed to arch laterally toward the aperture 45. It will be apparent, therefore, that pin 53 will be continually urged into engagement with the wrist pin bearing 55.

For the purposes of illustration the clearance 60 between the wrist pin carrier 40 and connecting rod 56 has been exaggerated to more clearly point out the operation of the invention. Wrist pin 44 may be moved slightly angularly with respect to the longitudinal axis of the connecting rod 56 since the portion of the pin 53 confined in recess 54 acts as a pivot point allowing such movement. The keying connection between the wrist pin and connecting rod will always be maintained because of the resilient means within the wrist pin. Any looseness developed between the wrist pin and connecting rod will be automatically taken up by the pin 53 being forced into recess 54 which in turn causes the lower portion (as viewed in Fig. 6) of wrist pin bearing 55 to bear against the lower portion of the wrist pin 44.

It will be appreciated from the above description that a connecting rod and piston assembly has been devised which is self-aligning to overcome inaccuracies in machining operations and also maintains the connecting rod and wrist pin in engagement at one point during all phases of operation of the compressor thereby eliminating noise caused by any looseness which may occur between the two parts. In each of the embodiments described the resilient means enclosed within the wrist pin maintains the required pressure between the wrist pin and connecting rod at all times. The resilient means is symmetrically disposed in each embodiment thereby providing an assembly which is statically and dynamically balanced, which feature is deemed extremely important in high speed compressors to eliminate uneven wear on certain of the parts due to excessive friction.

The embodiments of the invention chosen for illustration and description herein are those preferred as the result of selective test based upon the requirements for achieving the objects of the invention and developing the utility thereof in the most desirable manner, due regard being had to existing factors of economy, simplicity of design, and production methods. It will be appreciated, therefore, that the particular structural and functional aspects emphasized here are not intended to exclude but rather to suggest such other adaptations and modifications of the invention as fall within the spirit and scope of the invention as defined by the appended claims.

What is claimed is:

1. A piston and connecting rod assembly comprising a piston having a head portion enclosing one end of a hollow cylindrical imperforate piston skirt portion; a connecting rod having a wrist pin bearing at one end; a hollow wrist pin arranged within said wrist pin bearing and connected to said piston; and means allowing limited longitudinal and angular relative movement of the wrist pin with respect to the longitudinal axis of the connecting rod, said means comprising a slidable segment of greater thickness than the wall thickness of said hollow wrist pin adapted to fit in an arcuate slot formed in said wrist pin, a helical spring disposed along the longitudinal axis of said wrist pin and in frictional engagement with the interior wall of said wrist pin and having two oppositely projecting leg portions in frictional engagement with the interior wall of said piston skirt portion, one of said leg portions having a part adapted to engage a notch formed in one end of said wrist pin, said spring continually urging said slidable segment laterally from said wrist pin into engagement with said connecting rod bearing, and a key member arranged within said wrist pin bearing and projecting into an aperture formed in said wrist pin to prevent relative rotational movement of said wrist pin with respect to said wrist pin bearing.

2. A piston and connecting rod assembly comprising a piston including a hollow imperforate cylinder closed at one end; a connecting rod having a wrist pin bearing at one end; a hollow wrist pin arranged within said wrist pin bearing and connected to said piston, said wrist pin having an arcuate slot formed on its periphery between its ends; a segment slidably mounted in said slot for lateral movement with respect to said wrist pin, said segment being completely enclosed by and contacting said wrist pin bearing; means for continually urging said segment radially outwardly from said wrist pin into engagement with said wrist pin bearing, said means including a helical spring disposed along the longitudinal axis of said wrist pin and having its ends contacting diametrically opposed portions of the interior wall of said cylinder, said helical spring being in frictional engagement with the interior wall of said wrist pin and said segment.

3. A piston and connecting rod assembly comprising a piston having a head portion enclosing one end of a hollow cylindrical imperforate piston skirt portion; a connecting rod having a wrist pin bearing at one end; a hollow wrist pin having its ends connected to said piston, said wrist pin having a slot formed on its periphery; a segment adapted to fit within said slot and be enclosed by said wrist pin bearing; resilient means for urging said segment radially from said wrist pin into engagement with said wrist pin bearing, said means including a spring disposed along the longitudinal axis of said wrist pin, said spring being within said wrist pin and frictionally engaging the interior wall of said piston skirt portion.

4. In a bearing assembly, the combination comprising a tubular bearing member having a transverse arcuate slot formed on its periphery; supporting means for said tubular member; an arcuate element adapted to be received in said slot, said arcuate element having a thickness greater than the thickness of the wall of said tubular bearing member; resilient means within said tubular bearing member for urging said element outwardly laterally from said tubular bearing member, said means being in direct physical and frictional contact with the interior surface of said tubular bearing member and said element and extending from each end of said tubular bearing member; and a member supported on said tubular bearing member having its bearing surface covering said element and slot.

5. A connecting rod assembly comprising a connecting rod having a wrist-pin bearing at one end; a hollow wrist pin arranged within said wrist-pin bearing; and means allowing limited longitudinal and angular relative movement of the wrist-pin with respect to the longitudinal axis of the connecting rod, said means comprising a slidable member adapted to fit in an aperture formed in said wrist-pin and projecting laterally therefrom and resilient means disposed along the longitudinal axis of said wrist pin and in direct frictional engagement with said slidable member and the interior of said hollow wrist pin and extending substantially along the entire length of said wrist pin to constantly urge said slidable member into engagement with said wrist-pin bearing.

6. A connecting rod assembly comprising a connecting rod having a wrist-pin bearing at one end; a hollow wrist-pin arranged within said wrist-pin bearing, said wrist-pin having an aperture formed on its periphery between its ends; a member slidably mounted in said aperture for lateral movement with respect to said wrist-pin, said member being completely enclosed by and contacting said connecting rod bearing; means for continually urging said member radially outwardly from said wrist-pin into engagement with said wrist-pin bearing, said means including a longitudinally extending resilient member symmetrically disposed along the longitudinal axis of said wrist-pin having portions thereof on both sides of the longitudinal axis of said connecting rod and further disposed so as to directly engage in abutting frictional relation said slidable member.

7. A connecting rod assembly comprising a connecting rod having a wrist pin bearing at one end; a hollow wrist pin arranged within said wrist pin bearing; and means for permitting limited movement of the longitudinal axis of said wrist pin about the contact area between said wrist pin and wrist pin bearing, said means including a resilient member symmetrically disposed along the longitudinal axis of and within said wrist pin, said resilient member having two longitudinally oppositely projecting portions and a central portion, and a member laterally from said wrist pin adapted to slide laterally in an aperture formed in the periphery of said wrist pin and to abut in direct physical contact said central portion of said resilient member and be urged by said resilient member into engagement with said wrist pin bearing.

8. In a bearing assembly, the combination comprising a tubular bearing member having an aperture formed on its periphery; supporting means for said tubular member; an element adapted to be received in said aperture and project laterally therefrom; resilient means within said tubular bearing member for urging said element outwardly laterally from said tubular bearing member, said means being symmetrically disposed along the longitudinal axis of said tubular bearing member having a portion terminating near each longitudinally spaced end of said tubular bearing member; said resilient means being further disposed so that it is simultaneously in direct physical contact with said element and with the interior of said tubular member; and a member supported on said tubular bearing member having its bearing surface covering said element and aperture.

9. A connecting rod assembly comprising a connecting rod having a wrist pin bearing at one end; a hollow wrist pin arranged within said wrist pin bearing; and means allowing limited longitudinal and angular movement of the wrist pin with respect to the longitudinal axis of the connecting rod, said means comprising a slidable pin adapted to fit in an aperture formed in said wrist pin and project laterally into a recess formed in said wrist pin bearing to prevent relative rotation of the connecting rod with respect to said wrist pin, a leaf spring disposed along the longitudinal axis of said wrist pin and having a central portion depressed to provide a seat for one end of said pin, and a spring supporting member having a portion substantially semi-circular in cross-section to abut the interior wall of said wrist pin and provided with a pair of longitudinally spaced portions projecting laterally from said semi-circular portion being adapted to position the ends of said leaf spring whereby said central depressed portion of said spring is maintained adjacent said aperture.

10. A connecting rod assembly comprising a connecting rod having a wrist pin bearing at one end; a hollow wrist pin arranged within said wrist pin bearing, said wrist pin having an aperture formed on its periphery between its ends; a pin slidably mounted in said slot for lateral movement with respect to said wrist pin, said pin being completely enclosed by and contacting said wrist pin bearing; means for continually urging said pin radially outwardly from said wrist pin into engagement with said wrist pin bearing, said means including an arched leaf spring disposed along the longitudinal axis of said wrist pin having a centrally located portion depressed to form a seat for one end of said pin, and a spring supporting member having a portion substantially semi-circular in cross-section and provided with two longitudinally spaced portions projecting laterally from said semi-circular portion adapted to confine the ends of said spring whereby said spring is positioned so as to maintain said centrally located portion adjacent said aperture.

11. A connecting rod assembly comprising a connecting rod having a wrist pin bearing at one end; a hollow wrist pin arranged within said wrist pin bearing; and means for permitting limited movement of the longitudinal axis of said wrist pin about the contact area between said wrist pin and wrist pin bearing, said means including a spring supporting member having a portion substantially semi-circular in cross-section and having a pair of longitudinally spaced laterally projecting spring positioning portions, a pin projecting laterally from said wrist pin adapted to slide laterally in an aperture formed in the periphery of said wrist pin, and a leaf spring disposed along the longitudinal axis of and within said wrist pin having a central depressed portion to form a seat for one end of said pin and having its ends almost abutting said positioning portions whereby said leaf spring is confined within said wrist pin to urge said pin into engagement with said wrist pin bearing.

12. A connecting rod assembly comprising a connecting rod having a wrist pin bearing at one end; a hollow wrist pin, said wrist pin having an aperture formed on its periphery; a pin adapted to fit within said aperture and be enclosed by said wrist pin bearing; resilient means for urging said pin into engagement with said wrist pin bearing, said means including an arched flat spring disposed along the longitudinal axis of said wrist pin having a central portion depressed to provide a seat for one end of said pin, and a spring supporting member within said wrist pin having a pair of longitudinally spaced lateral projections adapted to confine the ends of said spring whereby said spring is maintained within said wrist pin.

13. In a bearing assembly, the combination comprising a tubular bearing member having a radially extending aperture formed on its periphery; supporting means for said tubular member; a pin slidably mounted in said aperture, said pin having a portion projecting inwardly toward the interior of said tubular member; resilient means within said tubular member for urging said pin outwardly laterally from said tubular bearing member, said means including a longitudinally disposed member within said tubular member having an arcuate surface with a radius substantially equal to the inner radius of said tubular member, and an arched flat spring having its oppositely disposed ends supported on longitudinally spaced portions of said member and having a central portion slightly depressed to form a seat for one end of said pin; and a member supported on said tubular member having its bearing surface covering said pin and slot.

14. In a connecting rod and wrist pin connection, the combination comprising a connecting rod having a wrist pin bearing at one end; a hollow wrist pin having a radially extending aperture between its ends; means to support said wrist pin; a slidable pin adapted to be received in said aperture and project laterally therefrom; resilient means supported within said wrist pin for urging said pin outwardly laterally from said wrist pin into engagement with said wrist pin bearing, said means comprising an arched flat spring longitudinally disposed and having a central portion abutting said slidable pin.

References Cited in the file of this patent

UNITED STATES PATENTS

| Number | Name | Date |
| --- | --- | --- |
| 443,860 | MacDonald | Dec. 30, 1890 |
| 526,837 | Hirsch | Oct. 2, 1894 |
| 1,152,876 | Brown et al. | Sept. 7, 1915 |
| 1,191,174 | Gilligan | July 18, 1916 |
| 1,410,493 | Meuvly | Mar. 21, 1922 |
| 1,480,185 | Setter | Jan. 8, 1924 |
| 1,568,833 | Harris | Jan. 5, 1926 |
| 1,643,720 | McKone | Sept. 27, 1927 |
| 1,921,607 | Curtis | Aug. 8, 1933 |
| 1,952,202 | Flammang et al. | Mar. 27, 1934 |
| 2,093,594 | Wild et al. | Sept. 21, 1937 |
| 2,234,124 | Jones | Mar. 4, 1941 |
| 2,394,409 | Steenstrup | Feb. 5, 1946 |

FOREIGN PATENTS

| Number | Country | Date |
| --- | --- | --- |
| 277,759 | Great Britain | Sept. 26, 1927 |